(12) United States Patent
Yoshikawa

(10) Patent No.: US 8,371,720 B2
(45) Date of Patent: Feb. 12, 2013

(54) DIFFUSION SHEET, DIFFUSION UNIT, ILLUMINATING UNIT, AND DISPLAY DEVICE

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 359 days.

(21) Appl. No.: 12/739,961

(22) PCT Filed: Jul. 23, 2008

(86) PCT No.: PCT/JP2008/063154
§ 371 (c)(1),
(2), (4) Date: Apr. 27, 2010

(87) PCT Pub. No.: WO2009/057362
PCT Pub. Date: May 7, 2009

(65) Prior Publication Data
US 2010/0246190 A1 Sep. 30, 2010

(30) Foreign Application Priority Data
Nov. 2, 2007 (JP) .................................. 2007-285774

(51) Int. Cl.
*G09F 13/04* (2006.01)
*G02F 1/13357* (2006.01)

(52) U.S. Cl. ....... 362/299; 362/97.2; 362/298; 362/300; 359/296

(58) Field of Classification Search .................. 362/298, 362/299, 600, 302, 97.1–97.3
See application file for complete search history.

(56) References Cited

U.S. PATENT DOCUMENTS
7,414,775 B2 * 8/2008 Tam et al. ..................... 359/296
8,182,105 B2 * 5/2012 Kuromizu ................... 362/97.2

FOREIGN PATENT DOCUMENTS
JP 2003-279979 A 10/2003
WO 2007/111353 A1 10/2007

OTHER PUBLICATIONS
Official Communication issued in International Patent Application No. PCT/JP2008/063154, mailed on Nov. 4, 2008.

* cited by examiner

*Primary Examiner* — Anabel Ton
(74) *Attorney, Agent, or Firm* — Keating & Bennett, LLP

(57) ABSTRACT

In a diffusion sheet (46), first reflection areas (AR1) with high reflectance and second reflection areas (AR2) with low reflectance are alternately arranged parallel to each other on a light receiving surface (46R), and third reflection areas (AR3) with high reflectance and fourth reflection areas (AR4) with low reflectance are alternately arranged parallel to each other on an light emitting surface (46F). In the diffusion sheet (46), the first reflection areas (AR1) and the fourth reflection areas (AR4) are opposed to each other, and the second reflection areas (AR2) and the third reflection areas (AR3) are opposed to each other.

11 Claims, 10 Drawing Sheets

DIFFUSION SHEET, DIFFUSION UNIT, ILLUMINATING UNIT, AND DISPLAY DEVICE

TECHNICAL FIELD

The present invention relates to a diffusion member (such as a diffusion sheet) that diffuses received light to emit resultant light, and to a diffusion unit integrated with the diffusion member. An illuminating unit including such a diffusion member or a diffusion unit and a display device (such as a liquid crystal display device) including such an illuminating unit can also be regarded as included in the scope of the present invention.

BACKGROUND ART

There have conventionally been developed various types of backlight units that supply light to a liquid crystal display panel (a non-light-emitting display panel) for a liquid crystal display device. Among light sources included in an area light-type backlight unit and the like is a fluorescent tube such as a hot cathode tube or a cold cathode tube.

In a case in which such fluorescent tubes are used, the brightness is high in portions over the fluorescent tubes, but in contrast, the brightness is low in portions over gaps between adjacent ones of the fluorescent tubes. This leads to a comparatively significant difference in brightness (light amount nonuniformity) between portions over the fluorescent tubes and portions over gaps between adjacent ones of the fluorescent tubes. Such light amount nonuniformity is called a lamp image, which is one of factors that degrade the quality of light (backlight light) from a backlight unit.

There have been invented various types of backlight units for eliminating the lamp image (see, for example, Patent Document 1). Among the simplest ones of such backlight units is a backlight unit 149 as shown in the sectional view of FIG. 10. In the backlight unit 149, reflection areas 'ar' are formed in a light receiving surface 146R of a diffusion sheet 146 located the closest to fluorescent tubes 142.

Most part of light traveling upward (directly upward) from the fluorescent tubes 142 is reflected by the reflection areas 'ar', and does not directly enter the diffusion sheet 146. This prevents the portions over the fluorescent tubes 142 from becoming excessively bright, leading to elimination of the lamp image.

Patent Document 1: JP-A-2003-279979

DISCLOSURE OF THE INVENTION

Problems to be Solved by the Invention

However, with this method, the lamp image is eliminated only when the diffusion sheet 146 (thus a liquid crystal display panel) is viewed from a front direction. This is because light incident on the diffusion sheet 146 from the fluorescent tubes 142 not perpendicularly but obliquely with respect to the diffusion sheet 146 (oblique light; see outline arrows in FIG. 10) passes through the diffusion sheet 146 without reaching the reflection areas 'ar'. That is, with the backlight unit 149 as shown in FIG. 10, a lamp image is generated when the backlight unit 149 is viewed from an oblique direction.

The present invention has been made in view of the foregoing, and an object of the present invention is to provide a diffusion member and the like that do not allow a lamp image to be generated not only when the diffusion member is viewed from a front direction but also when it is viewed from an oblique direction.

Means for Solving the Problem

According to one aspect of the present invention, a diffusion member has one surface thereof formed as a light receiving surface for receiving light, refracts light incoming through the light receiving surface while the light is traveling therethrough, and emits the light from another surface formed as a light emitting surface. In this diffusion member, a first reflection area having high reflectance and a second reflection area having low reflectance are alternately arranged parallel to each other on the light receiving surface, while a third reflection area having high reflectance and a fourth reflection area having low reflectance are alternately arranged parallel to each other on the light emitting surface. And, for example, in a direction of a thickness from the light receiving surface to the light emitting surface of the diffusion member, the first reflection area and the fourth reflection area are opposed to each other, and the second reflection area and the third reflection area are opposed to each other.

With this structure, if a fluorescent tube is located to be covered with the first reflection area, light that reaches the first reflection area from the fluorescent tube (light that perpendicularly reaches the first reflection area; directly upward light) is mostly reflected by the first reflection area having comparatively high reflectance. Some part of the light enters the diffusion member without being reflected by the first reflection area, and reaches the fourth reflection area that covers the first reflection area. The fourth reflection area, which has comparatively low reflectance, allows most of the light to be emitted therefrom. Thus, the light that passes through the fourth reflection area to be emitted therefrom does not have excessively high light intensity. This helps reduce light amount nonuniformity (a lamp image) caused by the directly upward light from the fluorescent tube when the diffusion member is viewed from a front direction.

On the other hand, the second reflection area, which is placed adjacent to the first reflection area and has lower reflectance than the first reflection area, allows most part of light from the fluorescent tube (light that reaches the second reflection area from an oblique direction; oblique light) to be incident on the diffusion member. The light incident on the diffusion sheet reaches the third reflection area that covers the second reflection area. The third reflection area, which has comparatively high reflectance, reflects most of the light. Thus, the light passes through the third reflection area to be emitted therefrom does not have excessively high light intensity. This helps reduce light amount nonuniformity caused by the oblique light from the fluorescent tube when the diffusion member is viewed from an oblique direction.

According to the present invention, when a direction in which the first and second reflection areas are arranged parallel to each other is called a parallel arrangement direction, it is desirable that the reflectance of the first reflection area and the reflectance of the second reflection area are as follows.

That is, in the first reflection area, reflectance of a portion including a first center which is a center of the first reflection area in the parallel arrangement direction is maximum first reflectance which is the highest reflectance, and reflectance of a portion extending away from the portion including the first center along the parallel arrangement direction is continuously decreased from the maximum first reflectance.

And, in the second reflection area, reflectance of a portion including a second center which is a center of the second reflection area in the parallel arrangement direction is minimum second reflectance which is the lowest reflectance, and reflectance of a part extending away from the portion including the second center along the parallel arrangement direction is continuously increased from the minimum second reflectance.

With this structure, for example, in a case where the fluorescent tube is placed so as to be covered by the first reflection area, the reflectance of the first reflection area and the reflectance of the second reflection area are commensurate with light intensity of light reaching the first reflection area and light intensity of light reaching the second reflection area, respectively. Thus, light reaching these reflection areas is efficiently reflected by them according to intensities of the light.

According to the present invention, in particular, it is desirable that the reflectance at border between the first and second reflection areas are the same, and that the reflectance continuously varies from the maximum first reflectance to the minimum second reflectance. This is because such a structure helps make every border between the first and second reflection areas less visible.

According to the present invention, it is desirable that, when a direction in which the third and fourth reflection areas are arranged parallel to each other is called a parallel arrangement direction, the reflectance of the third reflection area and the reflectance of the fourth reflection area are as follows.

That is, in the third reflection area, reflectance of a portion including a third center which is a center of the third reflection area in the parallel arrangement direction is maximum third reflectance which is the highest reflectance, and reflectance of a portion extending away from the portion including the third center along the parallel arrangement direction is continuously decreased from the maximum third reflectance.

And, in the fourth reflection area, reflectance of a portion including a fourth center which is a center of the fourth reflection area in the parallel arrangement direction is minimum fourth reflectance which is the lowest reflectance, and reflectance of a portion extending away from the portion including the fourth center along the parallel arrangement direction is continuously increased from the minimum fourth reflectance.

With this structure, for example, in a case where the fluorescent tube is placed so as to be covered by the first reflection area, the reflectance of the third reflection area and the reflectance of the fourth reflection area are commensurate with the light intensity of light reaching the third reflection area and the light intensity of light reaching the fourth reflection area after passing through the first and second reflection areas, respectively. Thus, light reaching these reflection areas is efficiently reflected thereby according to the light intensity of the light.

According to the present invention, it is desirable that the reflectance at border between the third and fourth reflection areas are the same, and the reflectance continuously varies from the maximum third reflectance to the minimum fourth reflectance. This is because such a structure helps make every border between the third and fourth reflection areas less visible.

According to the present invention, it is desirable that the first reflection area has higher reflectance than the third reflection area. Normally, light intensity of light that reaches the third reflection area on the light emitting surface is already decreased after passing through the light receiving surface. Thus, the third reflection area does not excessively reduce light intensity of light emitted from the light emitting surface, if the third reflection area has lower reflectance than the first reflection area.

According to the present invention, in an example of the diffusion member in which the first reflection area has higher reflectance than the third reflection area, the maximum first reflectance is higher than the maximum third reflectance, minimum first reflectance which is the lowest reflectance in the first reflection area is higher than minimum third reflectance which is the lowest reflectance in the third reflection area, and reflectance from the maximum first reflectance to the minimum first reflectance is higher than reflectance from the maximum third reflectance to the minimum third reflectance.

A diffusion unit including the above-described diffusion member and a lens layer that refracts light emitted from the diffusion member while the light is traveling therethrough can also be regarded as included in the scope of the present invention.

An illuminating unit including a light source that emits light and the above-described diffusion member that receives light at the light receiving surface, refracts the light while the light is traveling therethrough, and emits the light from the light emitting surface can also be regarded as included in the scope of the present invention.

Needless to say, an illuminating unit including a light source that emits light and the above-described diffusion unit that receives light at the light receiving surface, refracts the light while the light is traveling therethrough, and emits the light from the light emitting surface can also be regarded as included in the scope of the present invention.

And, a display device including the above-described illuminating unit can also be regarded as included in the scope of the invention.

ADVANTAGES OF THE INVENTION

According to the present invention, in the diffusion member, the high-low state of the reflectance in the reflection areas (the first and second reflection areas) on the light receiving surface is opposite to the high-low state of the reflectance in the reflection areas (the third and fourth reflection areas) on the light emitting surface. Thus, for example, with an arrangement such that the first reflection area covers the fluorescent tube, most part of directly upward light and the like emitted from the fluorescent tube is reflected by the first reflection area having comparatively high reflectance, and thus the directly upward light and the like are prevented from being easily emitted from a diffusion sheet. This helps reduce light amount nonuniformity caused by the directly upward light and the like when the diffusion sheet is viewed from a front direction.

Also, most part of oblique light and the like that have passed through the second reflection area having comparatively low reflectance and is placed adjacent to the first reflection area, is reflected by the third reflection area having comparatively high reflectance, and thus the oblique light and the like are prevented from being easily emitted from the diffusion sheet. This helps reduce light amount nonuniformity caused by the oblique light and the like when the diffusion sheet is viewed from an oblique direction.

LIST OF REFERENCE SYMBOLS

Figure 1:
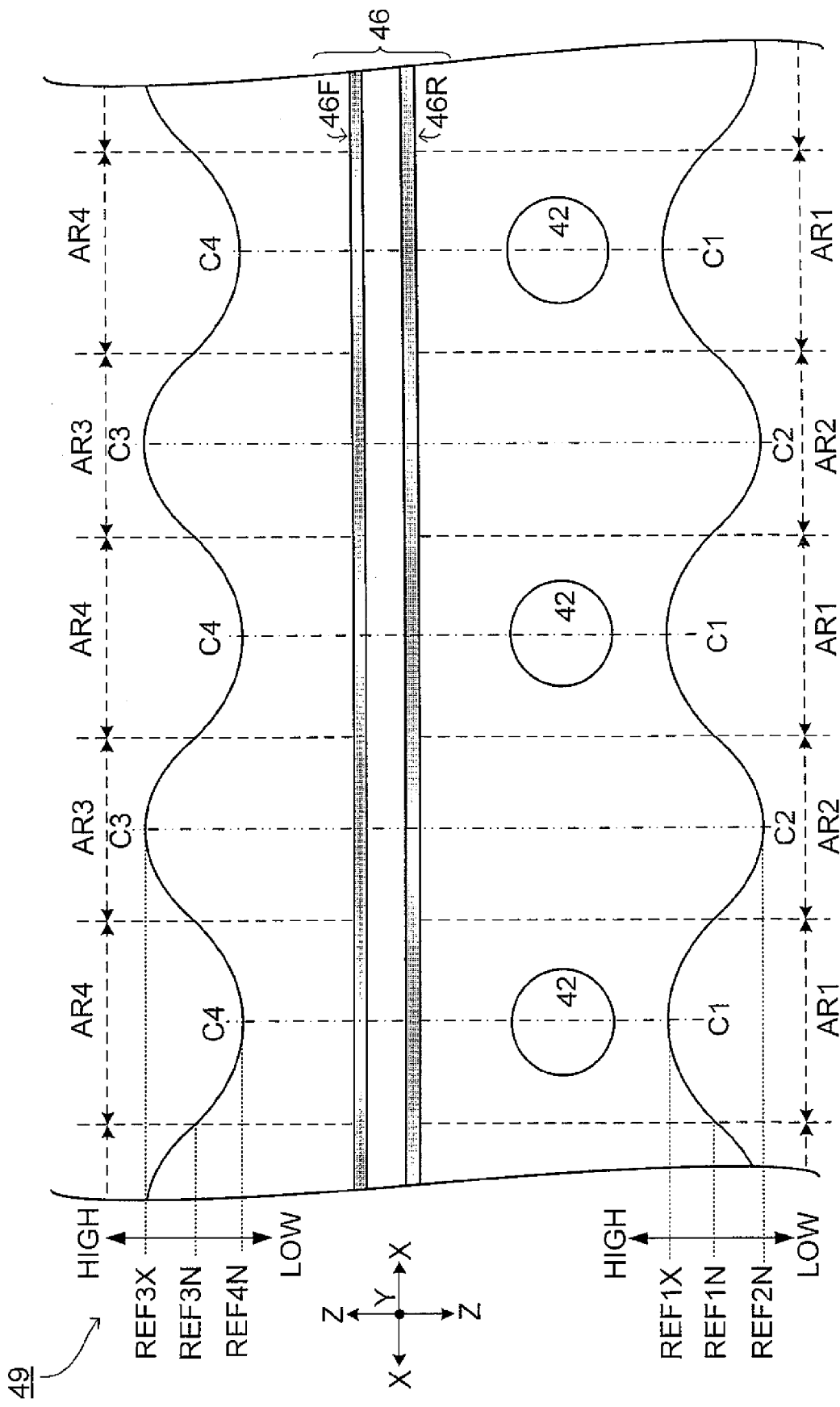
FIG. 1 is a sectional view taken along line A-A' in FIG. 9 to show a diffusion sheet and fluorescent tubes.

AR reflection area
AR1 first reflection area
C1 center of the first reflection area in direction X
AR2 second reflection area
C2 center of the second reflection area in direction X
AR3 third reflection area
C3 center of the third reflection area in direction X
AR4 fourth reflection area
C4 center of the fourth reflection area in direction X
AR5 fifth reflection area
AR6 sixth reflection area
39 liquid crystal display panel
42 fluorescent tube
43 lamp holder
44 backlight chassis
44B bottom surface of backlight chassis
45 reflection sheet
46 diffusion sheet (diffusion member)
46R light receiving surface of the diffusion sheet
46F light emitting surface of the diffusion sheet
OP optical material
LR lenticular lens layer
UT diffusion unit
47 lens sheet
49 backlight (illuminating unit)
89 liquid crystal display device (display device)
X parallel arrangement direction of the fluorescent tubes (parallel arrangement direction of the reflection areas)
Y extension direction of the fluorescent tubes
Z direction perpendicular to direction X and direction Y

BEST MODE FOR CARRYING OUT THE INVENTION

[First Embodiment]

Hereinafter, an embodiment of the present invention will be described with reference to the drawings. Reference signs for members and the like may sometimes be omitted for ease of description, and in such a case, a different drawing is to be referred to. Incidentally, a black dot in a drawing indicates a direction perpendicular to the sheet on which the drawing is drawn.

Figure 9:
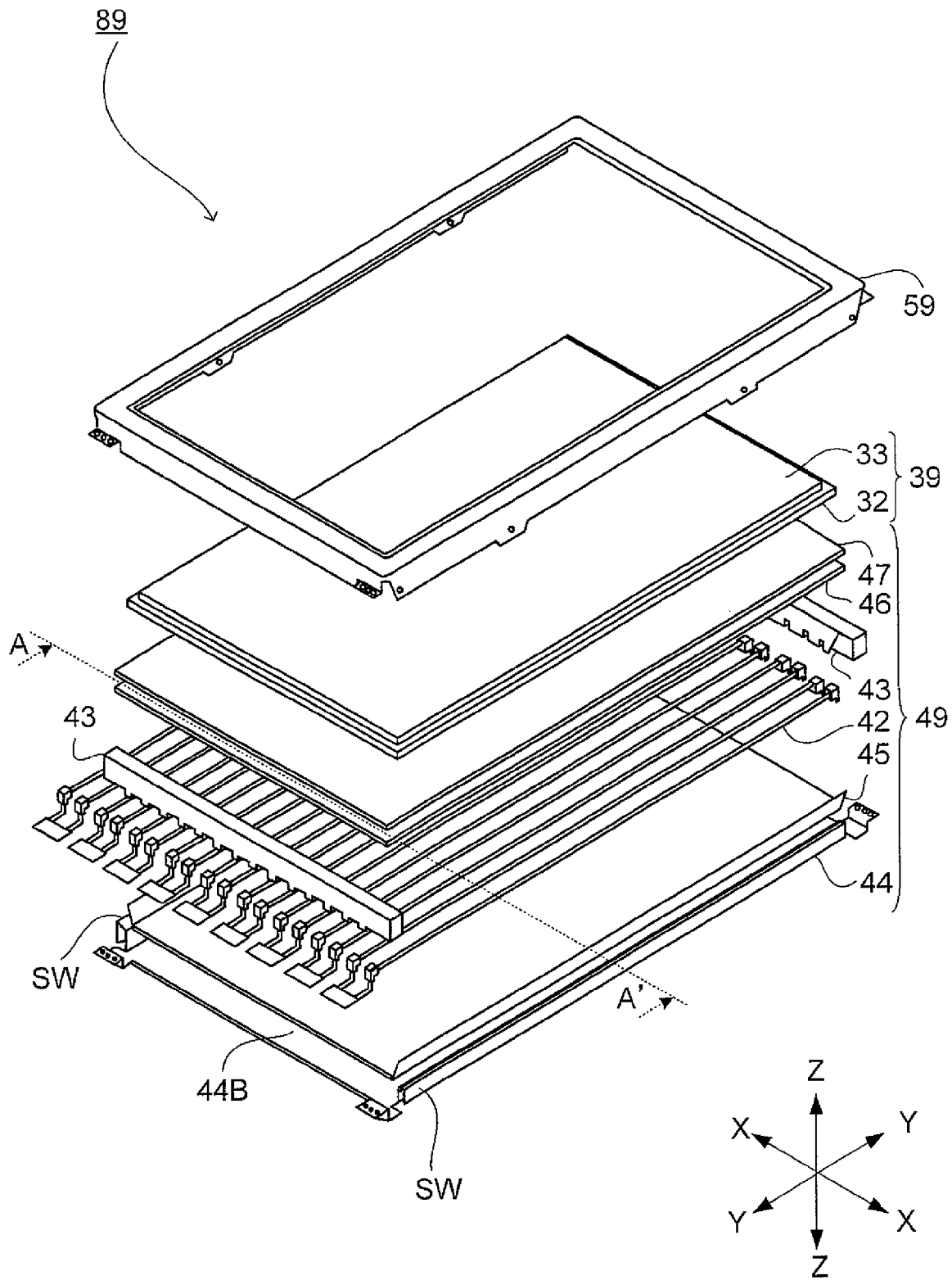
FIG. 9 is an exploded perspective view to show a liquid crystal display device.
Figure 10:
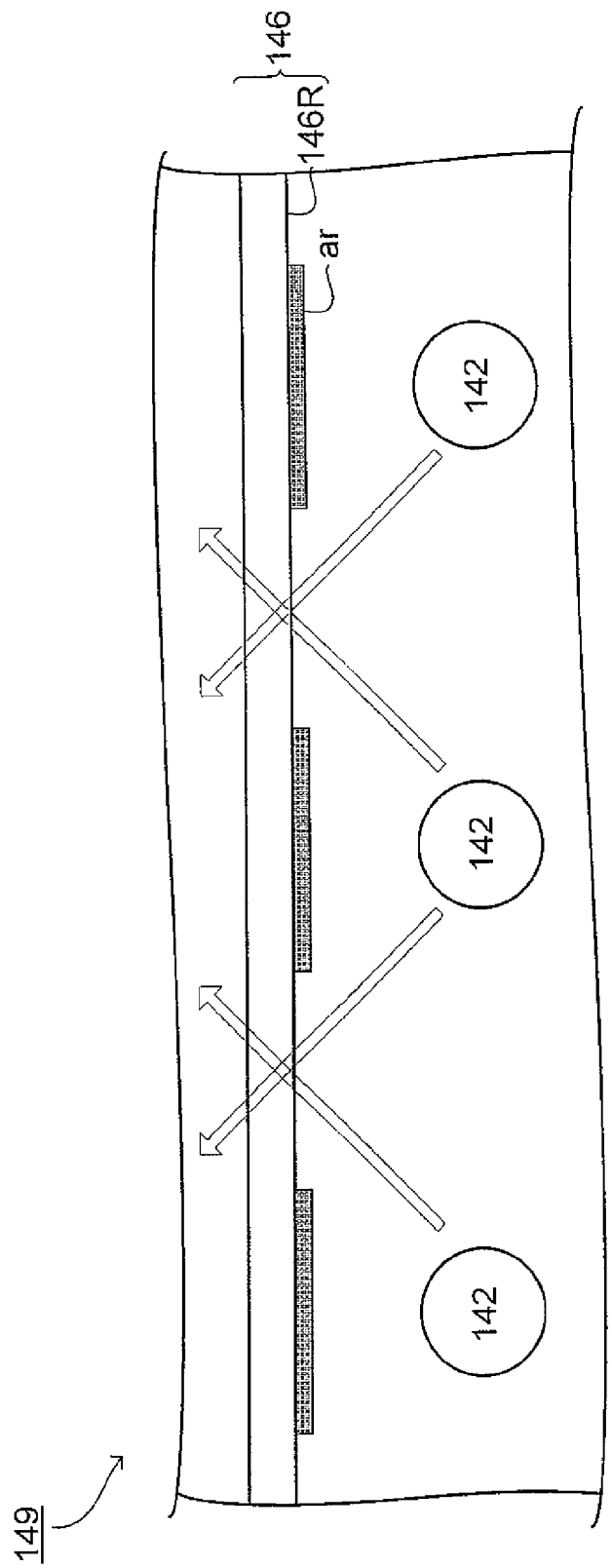
FIG. 10 is a sectional view to show a conventional backlight unit.

FIG. 9 is an exploded perspective view to show a liquid crystal display device 89 as an example of a display device. As shown in this figure, the liquid crystal display device 89 includes a liquid crystal display panel 39, a backlight unit (an illuminating unit) 49, and a bezel 59.

The liquid crystal display panel 39 is formed by adhering an active matrix substrate 32 that includes switching devices such as TFTs (thin film transistors) and a counter substrate 33 that faces the active matrix substrate 32 to each other with a seal material (not shown). Liquid crystal (not shown) is sealed in a gap between the substrates 32 and 33.

Since the liquid crystal panel 39 is a non-light-emitting type display panel, it exerts its display function by receiving light (backlight light) from the backlight unit 49. Thus, the display quality of the liquid crystal display panel 39 is improved by uniform irradiation of the entire surface of the liquid crystal display panel 39 with the light from the backlight unit 49.

To generate the backlight light, the backlight unit 49 includes a fluorescent tube (light source) 42, a lamp holder 43, a backlight chassis 44, a reflection sheet 45, a diffusion sheet (diffusion member) 46, and a lens sheet 47.

The fluorescent tube (linear light source) 42 is a light source formed in a linear shape (a stick shape, a column shape, and the like), and is provided in plurality in the backlight unit 49 (only a partial number of them are shown in the drawings for the sake of simplicity).

There is no limitation to the kind of the fluorescent tube 42, and it may be, for example, a cold cathode tube or a hot cathode tube. And, hereinafter, the parallel arrangement direction of the fluorescent tubes 42 (the direction in which the fluorescent tubes 42 are aligned) will be referred to as "direction X", the direction in which the fluorescent tubes 42 extend will be referred to as "direction Y", and a direction perpendicular to both direction X and direction Y will be referred to as "direction Z".

The lamp holder 43 is formed of a pair of block-shaped members provided for holding the fluorescent tubes 42, the diffusion sheet 46, and the lens sheet 47. More specifically, the lamp holders 43 respectively support one and the other ends of each of the fluorescent tubes 42, and thereby the fluorescent tubes 42 are held in the backlight unit 49. One surface of each of the lamp holders 43 facing the liquid crystal display panel 39 supports the diffusion sheet 46, and the lens sheet 47 is placed on the diffusion sheet 46. Thereby, the diffusion sheet 46 and the lens sheet 47 are held in the backlight unit 49.

For the securer holding of the fluorescent tubes 42, there may be provided lamp clips (not shown) for gripping the fluorescent tubes 42.

The backlight chassis 44 is a housing having a bottom surface 44B and walls (opposed walls) SW and SW that extend upward from the bottom surface 44B to face each other, and accommodates therein various members such as the fluorescent tubes 42.

The reflection sheet 45 is a reflection member that covers the bottom surface 44B of the backlight chassis 44. The reflection sheet 45 reflects light from the fluorescent tubes 42 disposed in the backlight chassis 44. More specifically, the reflection sheet 45 reflects part of radiating light emitted from the fluorescent tubes 42 (light emitted from the fluorescent tubes 42 in a radiating manner), and guides the reflected light to the open face of the backlight chassis 44.

The diffusion sheet 46 is a member formed of a resin containing, for example, polyethylene terephthalate, and has functions of scattering and diffusing light. The diffusion sheet 46 is placed so as to cover the fluorescent tubes 42 which are arranged parallel to each other on the bottom surface 44B of the backlight chassis 44. As a result, on entering the diffusion sheet 46, light from the fluorescent tubes 42 is scattered and diffused to be uniformly distributed in in-plane directions.

The lens sheet 47 is a sheet that has a lens-shaped portion in a sheet surface thereof and deflects the radiation characteristic of light (converges light), and is placed so as to cover the diffusion sheet 46. As a result, on entering the lens sheet 47, light from the diffusion sheet 46 is converged, and thus, emission brightness per unit area is improved.

The bezel 59, which is provided as an outer covering of a liquid crystal display device 89, is a member that sandwiches, in cooperation with the backlight chassis 44, the backlight unit 49 and the liquid crystal display panel 39 that is placed on the backlight unit 49.

In the above-described backlight unit 49, the fluorescent tubes 42 arranged parallel to each other emit light according to an AC signal supplied from an inverter (not shown). The light reaches the diffusion sheet 46 directly or after being reflected by the reflection sheet 45. The light that has reached the diffusion sheet 46 is further diffused to pass through the lens sheet 47, and thereby, the light is emitted as backlight light having improved emission brightness. The backlight light reaches the liquid crystal display panel 39 to allow it to display an image.

Figure 2:
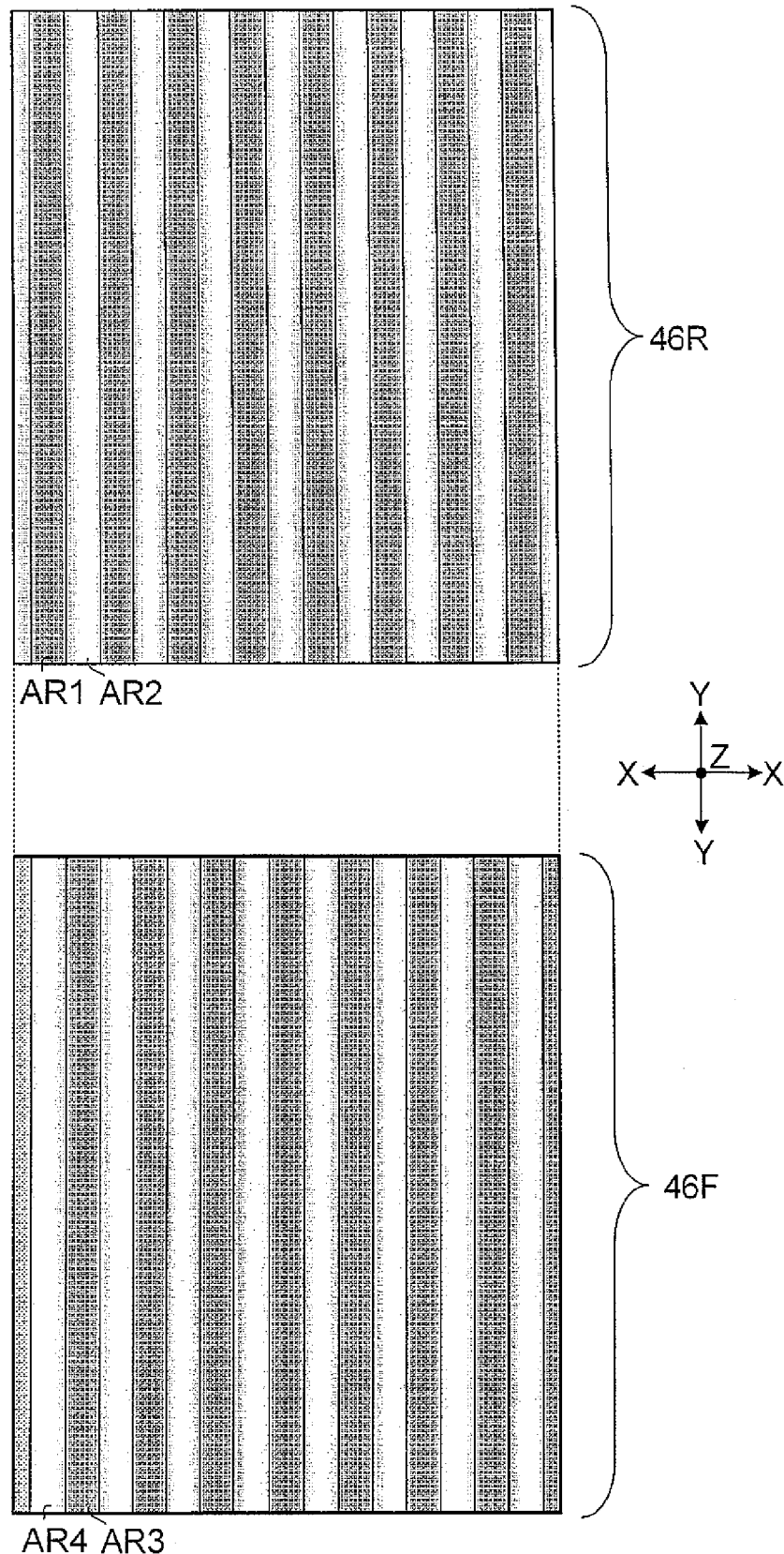
FIG. 2 is a plan view to show a light receiving surface and a light emitting surface of a diffusion sheet.

Here, a detailed description will be given of the diffusion sheet 46 with reference to FIGS. 1 and 2. FIG. 1 is a sectional view taken along line A-A' in FIG. 9 to show the diffusion sheet 46 and the fluorescent tubes 42. FIG. 2 is a plan view to show a light receiving surface 46R and a light emitting surface 46F of the diffusion sheet 46. In FIGS. 1 and 2, a difference in reflectance in the diffusion sheet 46 is indicated by a difference in gray level, and furthermore, FIG. 1 also shows reflectance values along direction X in a graph form ('HIGH' and 'LOW' in the figure indicate high and low reflectance values, respectively).

As shown in FIG. 1, the light receiving surface 46R of the diffusion sheet 46 includes two types of strip-shaped reflection areas AR (first reflection areas AR1 and second reflection areas AR2). Reflectance of the reflection area AR1 and reflectance of the reflection area AR2 are different from each other. More specifically, the first reflection area AR1 has higher reflectance than the second reflection area AR2.

The first reflection areas AR1 and the second reflection areas AR2 are alternately arranged parallel to each other in direction X, which is the parallel arrangement direction of the fluorescent tubes 42. In particular, the first reflection areas AR1 are each placed to be superposed on a corresponding one of the fluorescent tubes 42, while the second reflection areas AR2 are each placed to be superposed on a corresponding one of gaps between adjacent ones of the fluorescent tubes 42.

The light emitting surface 46F of the diffusion sheet 46, too, includes two types of strip-shaped reflection areas AR (third reflection areas AR3 and fourth reflection areas AR4). Reflectance of the reflection area AR3 and reflectance of the reflection area AR4 are different from each other. More specifically, the third reflection area AR3 has higher reflectance than the fourth reflection area AR4.

The third reflection areas AR3 and the fourth reflection areas AR4 are, like the first reflection area AR1 and the second reflection area AR2, alternately arranged parallel to each other in direction X. In particular, the third reflection areas AR3 are each placed to be superposed on a corresponding one of the second reflection areas AR2, while the fourth reflection areas AR4 are each placed to be superposed on a corresponding one of the first reflection areas AR1.

With this structure, most part of directly upward light traveling directly upward from the fluorescent tubes 42 (light traveling in direction Z from the fluorescent tubes 42) first reaches the first reflection areas AR1. The directly upward light, which has comparatively high light intensity, is reflected by the first reflection areas AR1, and thus, merely part of the directly upward light travels into the diffusion sheet 46. Although the light that has traveled into the diffusion sheet 46 travels toward the light emitting surface 46F while being diffused in various directions, large part of the light travels toward the fourth reflection areas AR4 that cover the first reflection areas AR1. However, since the amount itself of the light that has traveled into the diffusion sheet 46 is comparatively small, only a small amount of light reaches the fourth reflection areas AR4.

The fourth reflection areas AR4 have comparatively low reflectance, and thus most of the light that has reached the fourth reflection areas AR4 is emitted therefrom. However, since light intensity of the light that reaches the fourth reflection areas AR4 is already low, the light passing through the fourth reflection areas AR4 to be emitted therefrom does not have excessively high light intensity. This helps reduce light amount nonuniformity (light amount nonuniformity that makes the fluorescent tubes 42 visible as linear shaped images; a lamp image) caused by the directly upward light from the fluorescent tubes 42 when the diffusion member 46 (and thus the liquid crystal display panel 39) is viewed from a front direction.

Most part of light obliquely traveling from the fluorescent tubes 42 (light traveling from the fluorescent tubes 42 in a direction intersecting direction Z) reaches the second reflection areas AR2 having comparatively low reflectance, and thus the light reaching the second reflection areas AR2 mostly travels into the diffusion sheet 46. Although the light that has traveled into the diffusion sheet 46 travels toward the light emitting surface 46F while being diffused in various directions, large part of the light travels toward the third reflection areas AR3 that cover the second reflection areas AR2. And, since the amount itself of light that has traveled into the diffusion sheet 46 is large, a comparatively large amount of light reaches the third reflection areas AR3.

And, since the third reflection areas AR3 have comparatively high reflectance, merely part of the light that has reached the third reflection areas AR3 is emitted therefrom. As a result, the light obliquely passing through the third reflection areas AR3 to be emitted therefrom does not have excessively high light intensity. This helps reduce light amount nonuniformity generated by oblique light from the fluorescent tubes 42 when the diffusion member is viewed from an oblique direction (a lamp image in an oblique view).

Light has comparatively high light intensity when it travels into the diffusion sheet 46 after passing through the second reflection areas AR2 having comparatively low reflectance. Thus, reflection of the light thus having high light intensity, by the third reflection areas AR3, results in mixing (repeated reflection) of an increased amount of light inside the diffusion sheet 46. This makes it easier for resultant mixed light to be emitted through the fourth reflection areas AR4. As a result, a light amount of the backlight unit 49, particularly the light amount when it is viewed from a front direction, becomes comparatively large.

Many examples can be cited as examples of the reflectance of the first to fourth reflection areas AR1 to AR4. For example, as shown in FIG. 1, in each of the first reflection areas AR1, the reflectance of a portion thereof including a center (a first center) C1 which is a center (a center in a strip width) of the first reflection area AR1 in direction X is highest reflectance in the first reflection area AR1, and the reflectance of a portion of the first reflection area AR1 extending away from the portion including the first center C1 along direction X is continuously decreased from the highest reflectance (hereinafter, this highest reflectance will be referred to as maximum first reflectance REF1X).

With the above-described continuous variation (that is, monotone decrease) in reflectance from high reflectance to low reflectance, in a case, for example, in which the portion of each of the first reflection areas AR1 including the first center C1 and a corresponding one of the fluorescent tubes 42 are superposed on each other in direction Z (the width direction of the diffusion sheet 46), directly upward light from the fluorescent tubes 42 travels toward the portions, of the first reflection areas AR1, that each include the first center C1 and have the highest reflectance. Thus, the directly upward light having comparatively high light intensity is efficiently reflected and is thereby prevented from easily traveling into the diffusion sheet 46.

Light (oblique light) that obliquely travels from the fluorescent tubes 42 travels a comparatively long distance to reach the light receiving surface 46R of the diffusion sheet 46 (the distance being longer than, for example, the distance the directly upward light travels to reach the light receiving surface 46R). As a result, the oblique light is likely to have a lower light intensity than the directly upward light. More specifically, the light intensity of light reaching each of the first reflection areas AR1 is lower farther away from the first center C1 along direction X.

Therefore, it can be said that the reflectance of the first reflection areas AR1 corresponds to the light intensity of light that reaches the first reflection areas AR1. That is, light that reaches the first reflection areas AR1 is efficiently reflected thereby according to the light intensity of the light.

Incidentally, if the portion, of each of the first reflection areas AR1, that includes the first center C1 and a corresponding one of the fluorescent tubes 42 are superposed on each other in direction Z, light intensity of light that reaches the light receiving surface 46R of the diffusion sheet 46 is, with respect to each of the first reflection areas AR1, lower farther away along direction X from the first center C1 to a center position between the corresponding fluorescent tube 42 and another one of the fluorescent tubes 42 that is adjacent to the corresponding fluorescent tube 42.

To cope with this, in a case where the center position between the adjacent fluorescent tubes 42•42 and a portion, of a corresponding one of the second reflection areas AR2, including a center (second center) C2, which is a center of the second reflection area AR2 in direction X, are superposed on each other in direction Z, in each of the second reflection areas AR2, reflectance of the portion including the second center C2 is lowest reflectance, and reflectance of a portion extending away from the portion including the second center C2 along direction X is continuously increased from the lowest reflectance (hereinafter, this lowest reflectance will be referred to as minimum second reflectance REF2N).

Continuously varying (that is, monotonously increasing) from low to high reflectance in this way, the reflectance of each of the second reflection areas AR2 is commensurate with light intensity of light that reaches it. Thus, the second reflection areas AR2 reflect light that reaches them, according to the light intensity of the light, as efficiently as the first reflection areas AR1 do.

Light intensity that light has when it reaches the light emitting surface 46F after passing through the first and second reflection areas AR1 and AR2 on the light receiving surface 46R and then passing inside the diffusion sheet 46 is likely to be opposite to light intensity that the light has before it reaches the first and second reflection areas AR1 and AR2.

That is, in each of the fourth reflection areas AR4 on the light emitting surface 46F that cover the first reflection areas AR1, it is likely that the light intensity of light that reaches the fourth reflection area AR4 is higher farther away, along direction X, from a position in the fourth reflection area AR4 corresponding to the first center C1. Also, in each of the third reflection areas AR3 on the light emitting surface 46F that cover the second reflection areas AR2, it is likely that light intensity of light that reaches the third reflection area AR3 is lower farther away, along direction X, from a position in the third reflection area AR3 corresponding to the second center C2.

Thus, it is preferable that, in the case in which the first and second reflection areas AR1 and AR2 on the light receiving surface 46R correspond to (are opposed to) the fourth and third reflection areas AR4 and AR3, respectively, on the light emitting surface 46F in direction Z, the reflectance of the fourth reflection areas AR4 is opposite to that of the first reflection areas AR1, and the reflectance of the third reflection areas AR3 is opposite to that of the second reflection areas AR2.

That is, it is preferable that, in each of the fourth reflection areas AR4, reflectance of a portion thereof that is superposed, in direction Z, on the portion, of a corresponding one of the first reflection areas AR1, that includes the first center C1 {specifically, a portion of the fourth reflection area AR4 including a center (a fourth center C4) in direction X of the fourth reflection area AR4 itself} is lowest reflectance, and that reflectance of a portion extending away from the portion including the fourth center C4 along direction X is continuously increased from the lowest reflectance (hereinafter, this lowest reflectance will be referred to as minimum fourth reflectance REF4N).

With this continuous variation from low reflectance to high reflectance, even if light intensity of light that passes through the first reflection areas AR1 to reach the fourth reflection areas AR4 is higher farther away along direction X from the fourth center C4, the fourth reflection areas AR4 efficiently reflect the light according to the light intensity of the light.

Also, it is preferable that, in each of the third reflection areas AR3, reflectance of a portion thereof that is superposed, in direction Z, on the portion, of a corresponding one of the second reflection areas AR2, that includes the second center C2 {specifically, a portion of the third reflection area AR3 including a center (a third center C3) in direction X of the third reflection area AR3 itself} is highest reflectance, and that reflectance of a portion extending away from the portion including the third center C3 along direction X is continuously decreased from the highest reflectance (hereinafter, this highest reflectance will be referred to as maximum third reflectance REF3X).

With the above-described continuous variation in reflectance from high reflectance to low reflectance, even if light intensity of light that passes through the second reflection area AR2 to reach the third reflection area AR3 is lower farther away along direction X from the third center C3, the third reflection area AR3 efficiently reflects light that reaches it according to the light intensity of the light.

In the case in which the reflectance of each of the first to fourth reflection areas AR1 to AR4 continuously varies along direction X as described above, it is preferable that the reflectance at border between the first and second reflection areas AR1 and AR2 are the same, and that the variation in reflectance continuously between the maximum first reflectance REF1X and the minimum second reflectance REF2N is continuous. Furthermore, it is preferable that the reflectance at border between the third and fourth reflection areas AR3 and AR2 are the same, and that the variation in reflectance continuously between the maximum third reflectance REF3X and the minimum fourth reflectance REF4N is continuous. This is because such a structure helps make the borders between the reflection areas less visible.

Moreover, it is preferable that the first reflection areas AR1 on the light receiving surface 46R of the diffusion sheet 46 have higher reflectance than the third reflection areas AR3 on the light emitting surface 46F of the diffusion sheet 46. This is because, since light intensity of light that reaches the third reflection areas AR3 on the light emitting surface 46F is already low after passing through the light receiving surface 46R (in particular, the first reflection areas AR1), if the third reflection areas AR3 have higher reflectance than the first reflection areas AR1, light emitted from the third reflection areas AR3 may have excessively low light intensity and thus become insufficiently bright.

Incidentally, in the case in which the reflectance of the first and third reflection areas AR1 and AR3 continuously vary as shown in FIG. 1, the following is preferable. That is, the maximum first reflectance REF1X in the first reflection areas AR1 is higher than the maximum third reflectance REF3X in the third reflection areas AR3, minimum first reflectance REF1N which is the lowest reflectance in the first reflection areas AR1 is higher than minimum third reflectance REF3N which is the lowest reflectance in the third reflection areas AR3, and reflectance from the maximum first reflectance REF1X to the minimum first reflectance REF1N is higher than reflectance from the maximum third reflectance REF3X to the minimum third reflectance REF3N.

With this structure, excessive decrease of the amount of light emitted from the third reflection areas AR3 is securely prevented, and thus light intensity of backlight light is appropriately maintained.

[Second Embodiment]

A second embodiment will now be described. Such members as function similarly to their counterparts in Embodiment 1 are identified by common reference signs and no description of them will be repeated.

Figure 3:
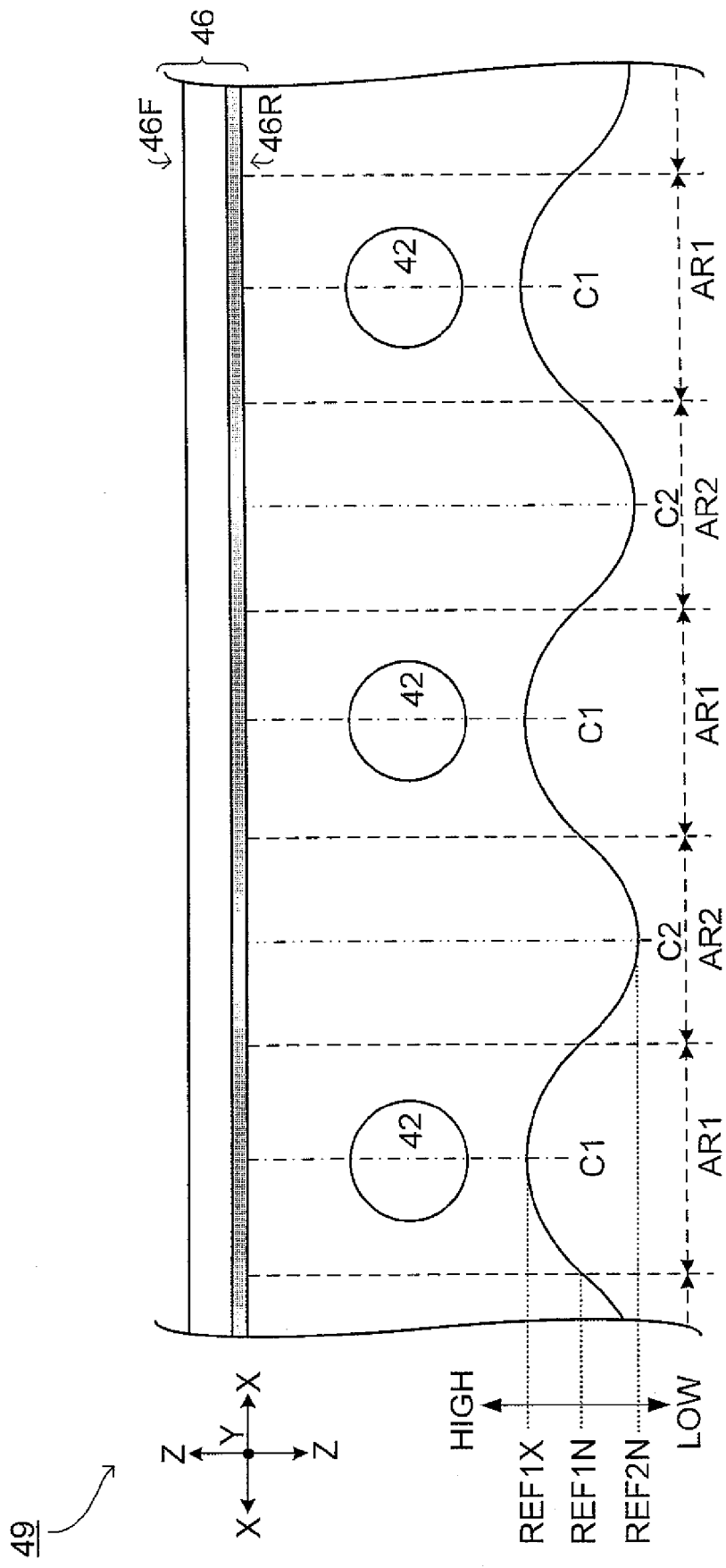
FIG. 3 is a sectional view to show another example of the diffusion sheet and the fluorescent tubes shown in FIG. 1.

In the first embodiment, the reflection areas AR (AR1 to AR4) are formed on the two surfaces 46F and 46R of the diffusion sheet 46. This is not meant as limitation, however, and the reflection areas AR may be formed only on one of the two surfaces. For example, the first reflection areas AR1 and the second reflection areas AR2 may be formed on the light receiving surface 46R of the diffusion sheet 46 as shown in FIG. 3 (the first reflection areas AR1 have higher reflectance than the second reflection areas AR2 as in the first embodiment).

That is, this diffusion sheet 46 is structured such that two different types of strip-shaped reflection areas AR1 and AR2 are alternately arranged parallel to each other in a same direction as direction X (that is, the reflectance is alternately high and low in the light receiving surface 46R).

Furthermore, the reflectance at border between the first and second reflection areas AR1 and AR2 are the same, and the reflectance continuously varies from the maximum first reflectance REF1X to the minimum second reflectance REF2N. In other words, the variation in reflectance (variation from high reflectance to low reflectance and variation from low reflectance to high reflectance) in the light receiving surface 46R is continuous.

Moreover, the minimum reflectance REF2N in the second reflection areas AR2 is not zero, and thus, every portion of the second reflection areas AR2 has reflectance that is sufficiently high to allow it to reflect light. And, the first reflection areas AR1 are each placed to be superposed on a corresponding one of the fluorescent tubes 42, while the second reflection areas AR2 are each placed to be superposed on a corresponding one of the gaps between adjacent ones of the fluorescent tubes 42•42 (it is preferable that the portions each including the first center C1 are each superposed on a corresponding one of the fluorescent tubes 42, and that the portions each including the second center C2 are each superposed on a corresponding one of the gaps between adjacent ones of the fluorescent tubes 42•42).

With this structure, most part of the directly upward light from the fluorescent tubes 42 reaches the first reflection areas AR1, while most part of the oblique light from the fluorescent tubes 42 reaches the second reflection areas AR2. The directly upward light, which has comparatively high light intensity, is reflected by the first reflection areas AR1 having comparatively high reflectance, and thus, merely part of the directly upward light travels into the diffusion sheet 46. Thus, the amount of light emitted from the light emitting surface 46F of the diffusion sheet 46 can be adjusted by appropriately setting the reflectance of the first reflection areas AR1 to reduce the light amount nonuniformity caused by the directly upward light from the fluorescent tubes 42 when the diffusion sheet 46 is viewed from a front direction.

The oblique light, which has a lower light intensity than the directly upward light, reaches the second reflection areas AR2. The second reflection areas AR2 have reflectance of some degree, although it is lower than the reflectance of the first reflection areas AR1. Thus, the amount of light emitted from the light emitting surface 46F of the diffusion sheet 46 can be adjusted by appropriately setting the reflectance of the second reflection areas AR2 to reduce the light amount nonuniformity caused by the oblique light from the fluorescent tubes 42 when the diffusion sheet 46 is viewed from an oblique direction.

Figure 4:
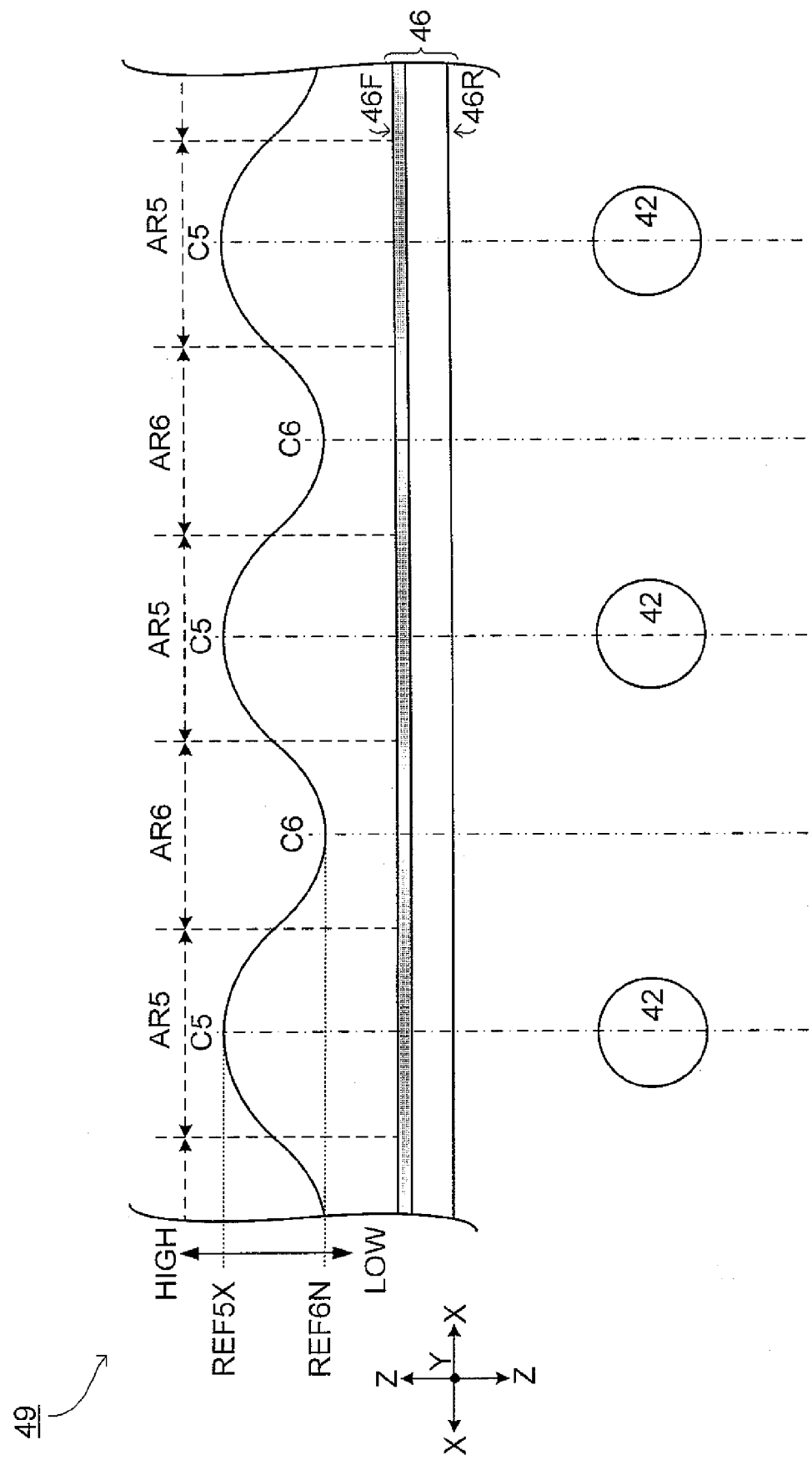
FIG. 4 is a sectional view to show another example of the diffusion sheets and the fluorescent tubes shown in FIGS. 1 and 3.

In addition to the diffusion sheet 46 in which reflection areas are formed only on the light receiving surface as the first and second reflection areas AR1 and AR2 as shown in FIG. 3, there are other types of diffusion sheets 46 that provide the same effects and advantages. FIG. 4 shows an example of such diffusion sheets 46; in the diffusion sheet 46, two different types of strip-shaped reflection areas (fifth reflection areas AR5 and sixth reflection areas AR6) are alternately arranged in a same direction as direction X on the light emitting surface 46F.

In this diffusion sheet 46, the fifth reflection areas AR5 have higher reflectance than the sixth reflection areas AR6. Furthermore, in each of the fifth reflection areas AR5, it is preferable that reflectance of a portion that includes a center (fifth center) C5 which is a center of the fifth reflection area AR5 in direction X is highest reflectance, and that reflectance of a portion extending away from the portion including the fifth center C5 along direction X is continuously decreased from the highest reflectance (this highest reflectance will hereinafter be referred to as the maximum fifth reflectance REF5X).

Moreover, in each of the sixth reflection areas AR6, it is preferable that reflectance of a portion that includes a center (sixth center) C6 which is a center of the sixth reflection area AR6 in direction X is lowest reflectance, and that reflectance of a portion extending along direction X away from the portion including the sixth center C6 is continuously increased from the lowest reflectance (the lowest reflectance will hereinafter be referred to as the minimum sixth reflectance REF6N).

Furthermore, the reflectance at border between the third and fourth reflection areas AR5 and AR6 are the same, and the reflectance continuously varies from the maximum fifth reflectance REF5X to the minimum sixth reflectance REF6N. That is, variation in reflectance in the light emitting surface 46F is continuous.

Moreover, the minimum reflectance REF6N in the sixth reflection areas AR6 is not zero, and thus every portion of the second reflection areas AR6 has reflectance that is sufficiently high to allow it to reflect light. And, the fifth reflection areas AR5 are each placed to be superposed on a corresponding one of the fluorescent tubes 42, while the sixth reflection areas AR6 are each placed to be superposed on a corresponding one of gaps between adjacent ones of the fluorescent tubes 42 (it is preferable that the portion of each of the fifth reflection areas AR5 that includes the fifth center C5 and the corresponding one of the fluorescent tubes 42 are superposed on each other, and that the portion of each of the sixth reflection areas AR6 that includes the sixth center C6 and the corresponding one of the gaps between adjacent ones of the fluorescent tubes 42•42 are superposed on each other).

With this structure, most part of the directly upward light from the fluorescent tubes 42 passes through the light receiving surface 46R and inside the diffusion sheet 46 to reach the fifth reflection areas AR5. Most part of the oblique light from the fluorescent tubes 42 also passes through the light receiving surface 46R and inside the reflection sheet 46 to reach the sixth reflection areas AR6.

The directly upward light, which has comparatively high light intensity, is reflected by the fifth reflection areas AR5 having comparatively high reflectance, and thus, merely part of the directly upward light is emitted through the light emitting surface 46F. Thus, the amount of light emitted from the light emitting surface 46F of the diffusion sheet 46 can be adjusted by appropriately setting the reflectance of the fifth reflection areas AR5 to reduce light amount nonuniformity caused by the directly upward light from the fluorescent tubes 42 when the diffusion sheet 46 is viewed from a front direction.

The oblique light, which has lower light intensity than the directly upward light, reaches the sixth reflection areas AR6. The sixth reflection areas AR6 have reflectance of some degree, although it is lower than the reflectance of the fifth reflection areas AR5. Thus, the amount of light emitted from the light emitting surface 46F of the diffusion sheet 46 can be adjusted by appropriately setting the reflectance of the sixth reflection areas AR6 to reduce light amount nonuniformity caused by the oblique light from the fluorescent tubes 42 when the diffusion sheet 46 is viewed from an oblique direction.

According to the diffusion sheets 46 shown in FIGS. 3 and 4 referred to above, it can be said that the reflectance is alternately high and low either in the light receiving surface 46R or in the light emitting surface 46F, and that the variation from high reflectance to low reflectance and from low reflectance to high reflectance is continuous (note that the low reflection is not zero).

[Other Embodiments]

It should be understood that the embodiments specifically described above are not meant to limit the present invention, and that many variations and modifications can be made within the spirit of the present invention.

Figure 5:
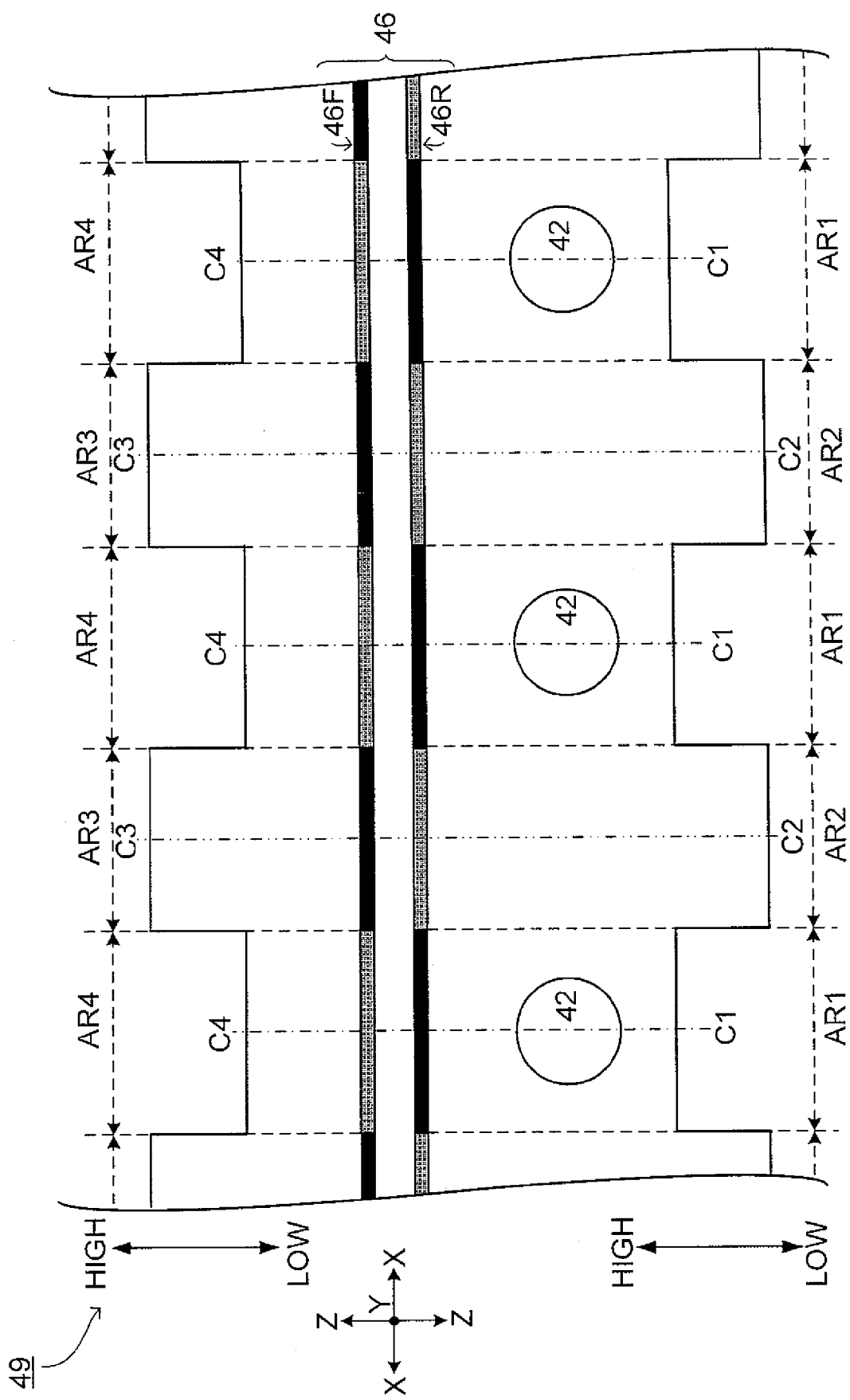
FIG. 5 is a sectional view to show another example of the diffusion sheets and the fluorescent tubes shown in FIGS. 1, 3, and 4.

As shown in FIG. 5, for example, reflectance within each of the reflection areas (AR1 to AR4) does not have to vary. That is, the reflectance may be uniform over the entire surface within each of the reflection areas (AR1 to AR4). Even with this structure, if the first reflectance areas AR1 have higher reflectance than the second reflection areas AR2, and the third reflectance areas AR3 have higher reflectance than the fourth reflection areas AR4, light amount nonuniformity (a lamp image occurring when viewed from front and oblique directions) caused by directly upward light and oblique light from the fluorescent tubes 42 is reduced to the same extent as described in the description of the first embodiment.

Incidentally, even if the reflectance of the second and fourth reflection areas AR2 and AR4 are close to zero (that is, even if transmittance is close to 100%), generation of a lamp image is reduced when the diffusion sheet 46 is viewed from front and oblique directions, as long as the first reflection areas AR1 reflect most part of the direct upward light and the third reflection areas AR3 reflect most part of the oblique light.

If the first reflection areas AR1 have higher reflectance than the second reflection areas AR2 and the third reflection areas have higher reflectance than the fourth reflection areas AR4, the reflectance may vary in the following manner.

Figure 6:
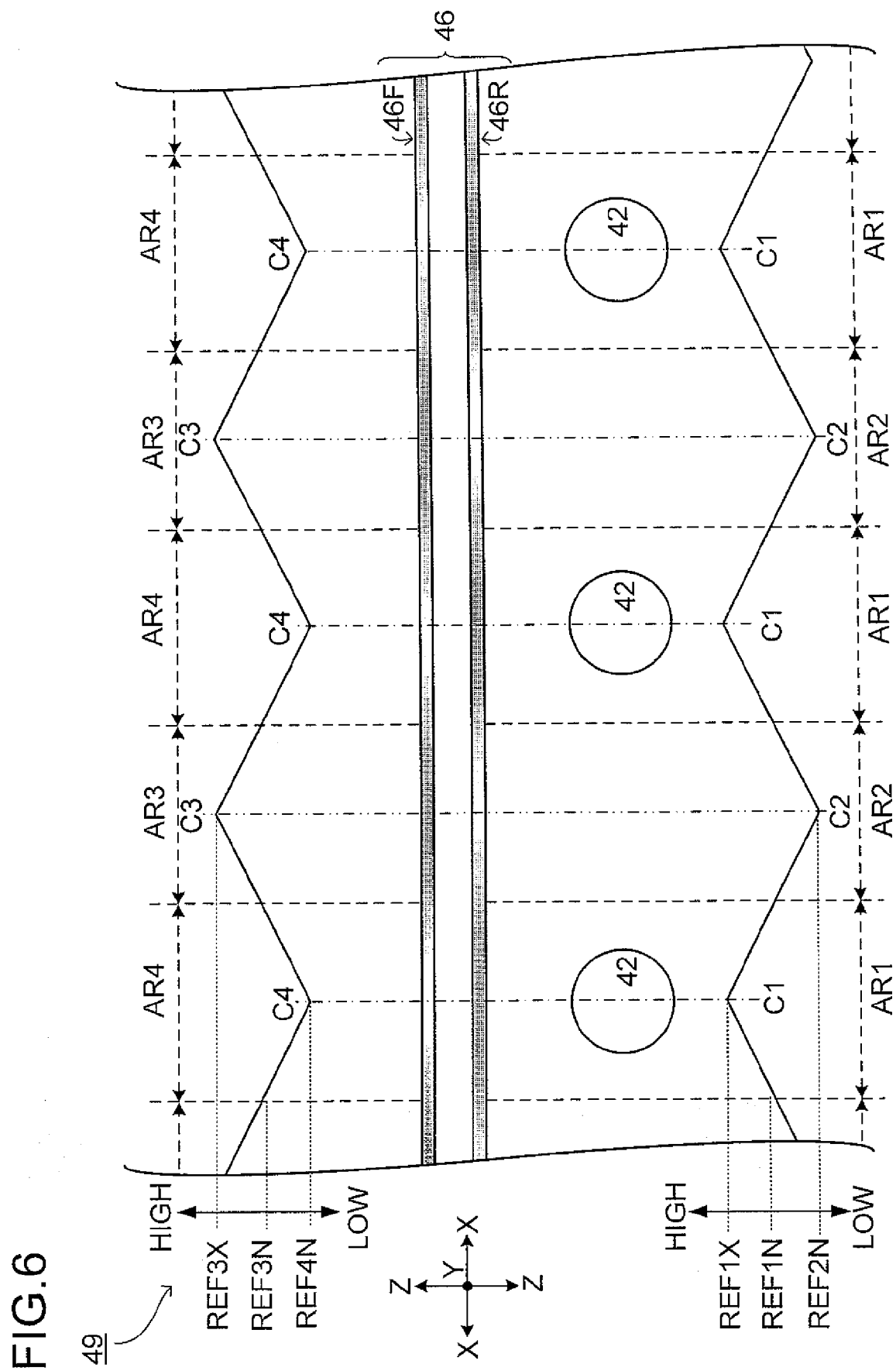
FIG. 6 is a sectional view to show another example of the diffusion sheets and the fluorescent tubes shown in FIGS. 1 and 3 to 5.

For example, as shown in FIG. 6, in each of the light receiving surface 46R and the light emitting surface 46F of the diffusion sheet 46, variation in reflectance may be a linear variation instead of a sinusoidal variation. More specifically, the variation in reflectance may be such that the reflectance linearly varies from the maximum first reflectance REF1X in the first reflection area AR1 to the minimum second reflectance REF2N in the second reflection area AR2, and further, the reflectance linearly varies from the maximum third reflectance REF3X of the third reflection area AR3 to the minimum fourth reflectance REF4N of the fourth reflection area AR4.

Figure 7:
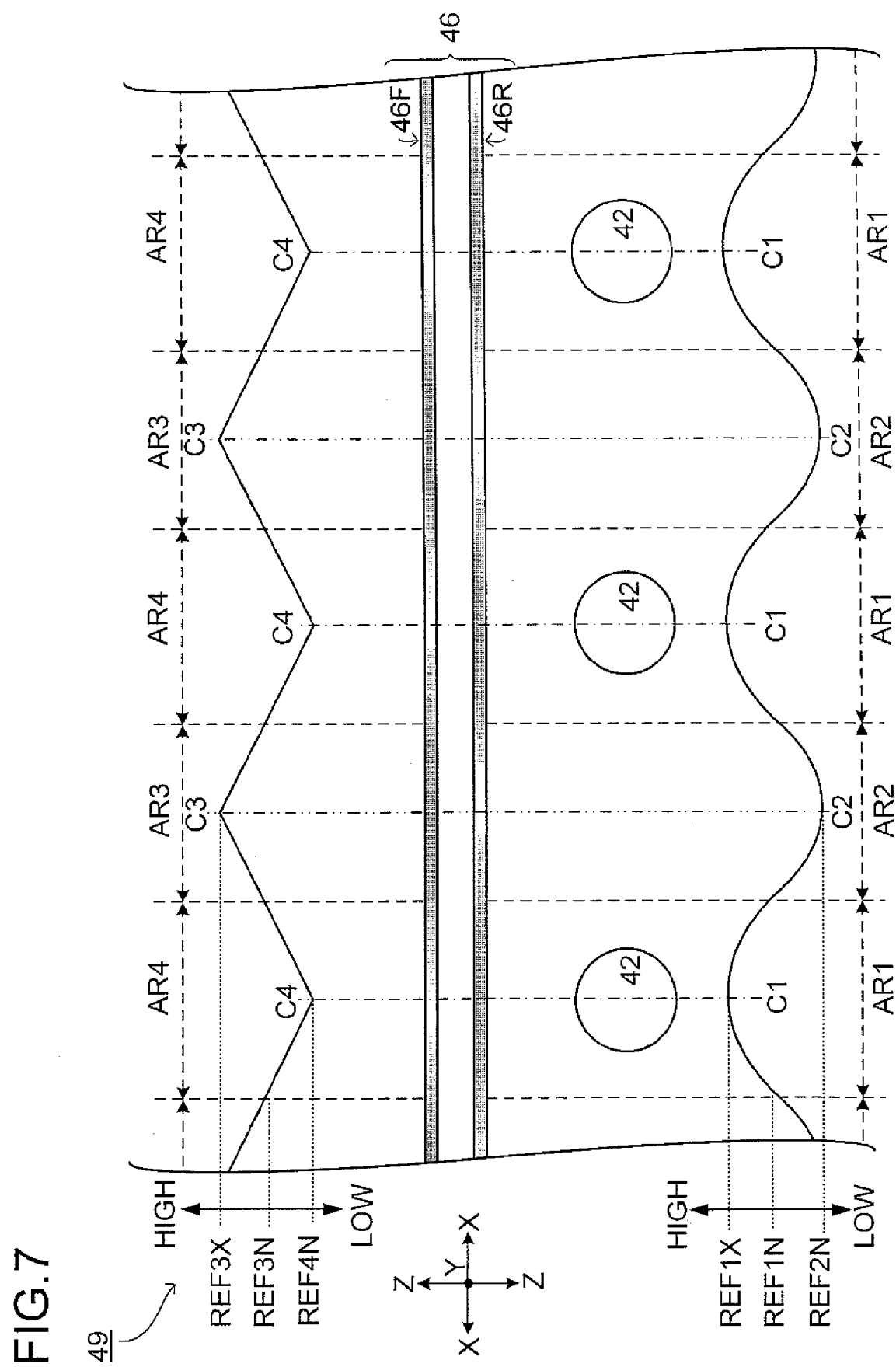
FIG. 7 is a sectional view to show another example of the diffusion sheets and the fluorescent tubes shown in FIGS. 1 and 3 to 6.

Or, as shown in FIG. 7, the variation in reflectance in the diffusion sheet 46 may be such that the reflectance varies sinusoidally in the light receiving surface 46R and linearly in the light emitting surface 46F, or reversely, such that the reflectance varies linearly in the light receiving surface 46R and sinusoidally in the light emitting surface 46F.

The maximum first reflectance REF1X in the first reflection areas AR1 and the maximum third reflectance REF3X in the third reflection areas AR3 may be either equal to or different from each other. Likewise, the minimum second reflectance REF2N in the second reflection areas AR2 and the minimum fourth reflectance REF4N in the fourth reflection areas AR4 may be either equal to or different from each other.

This is because light amount nonuniformity caused by directly upward light and oblique light from the fluorescent tubes 42 is reduced as described in the description of the first embodiment, as long as the first reflection areas AR1 have higher reflectance than the second reflection areas AR2 and the third reflection areas AR3 have higher reflectance than the fourth reflection areas AR4. Thus, it can also be said that, as long as the first reflection areas AR1 generally have higher reflectance than the second reflection areas AR2, and the third reflection areas AR3 generally have higher reflectance than the fourth reflection areas AR4, the variation in reflectance within each of the reflection areas (AR1 to AR4) may partially deviate from monotone increase or monotone decrease.

Figure 8:
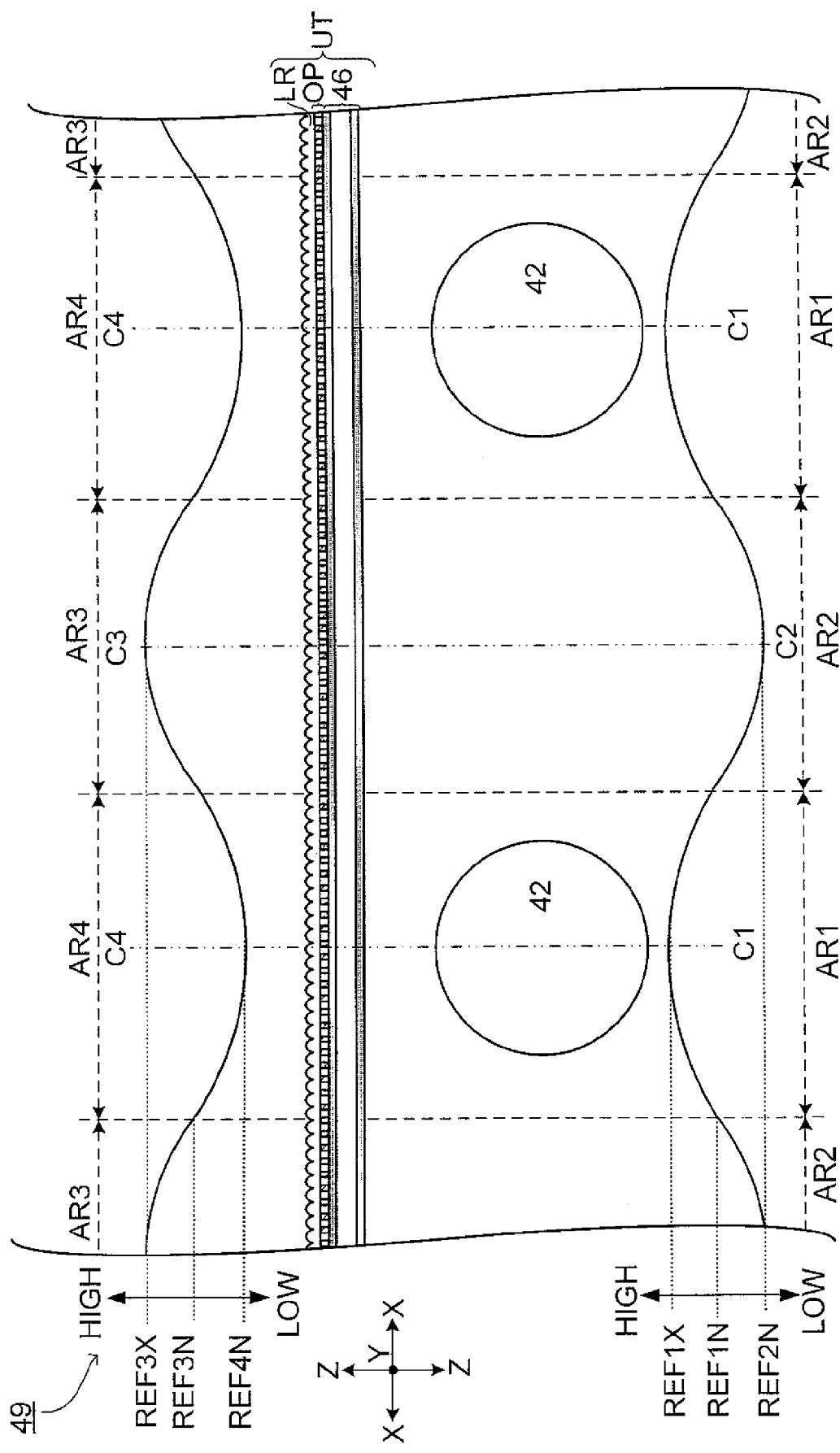
FIG. 8 is a sectional view to show a diffusion unit.

Although the above descriptions deal with the diffusion sheet 46 alone as an example, the reflection areas (AR1 to AR4) may be formed, as shown in FIG. 8, in a diffusion unit UT in which a lenticular lens layer LR is provided on the diffusion sheet 46 (more specifically, on the light emitting surface 46) via an optical material OP that contains dispersed particles. This is because the same effects and advantages as obtained with the first embodiment can also be obtained with this structure.

Needless to say, the diffusion unit UT may be such that the lenticular lens layer LR is provided on the light emitting surface 46F of the diffusion sheet 46 shown in any of FIGS. 3 to 7 via the optical material OP that contains dispersed particles. This is because the diffusion unit UT using the diffusion sheet 46 shown in either FIG. 3 or 4 provides the same effects and advantages as those provided by the second embodiment, and the diffusion unit UT using the diffusion sheet 46 shown in any of FIGS. 5 to 7 provides the same effects and advantages as those provided by the first embodiment.

Although the above descriptions deal with the fluorescent tube 42 as a light source, but this is not meant as a limitation. For example, an LED (light emitting diode) may be used as a light source. For example, if LEDs are arranged in matrix on the bottom surface 44B of the backlight chassis 44, the LEDs arranged in rows cause light amount nonuniformity similar to a lamp image. To prevent this, it is desirable that the backlight unit 49 adopts any of the above described diffusion sheets 46.

The first embodiment is structured such that the first reflection areas AR1 cover the fluorescent tubes 42, while the second reflection areas AR2 cover the gaps between adjacent ones of the fluorescent tubes 42·42, and further, the fourth reflection areas AR4 are opposed to the first reflection areas AR1, while the third reflection areas AR3 are opposed to the second reflection areas AR2.

This, however, is not meant as a limitation, and for example, the structure may be such that the second reflection areas AR1 cover the fluorescent tubes 42 while the first reflection areas AR2 cover the gaps between adjacent ones of the fluorescent tubes 42·42, and further, the fourth reflection areas AR4 are opposed to the first reflection areas AR1, while the third reflection areas AR3 are opposed to the second reflection areas AR2. This is because, if the reflectance of the reflection areas AR (AR1 to AR4) are appropriately set, even such a diffusion sheet 46 provides the same effects and advantages as those provided by the first embodiment.

The reflection areas AR described above are formed by applying a reflection agent to the surfaces (the light receiving surface 46R and the light emitting surface 46F) of the reflection sheet 46. The variation in reflectance in the reflection areas AR preferably correspond to variation in density of dots of the reflection agent, which is applied in a dot pattern. This, however, is not meant as a limitation, and for example, the reflectance may vary corresponding to variation in area of the reflection agent applied in a dot pattern, or, the reflectance may vary corresponding to both the variation in density of dots of the reflection agent applied in the dot pattern and the variation in area of the reflection agent applied in the dot pattern.

The variation in reflectance can be achieved by a method other than applying the agent in a dot pattern. For example, the variation in reflectance can be achieved by varying the thickness of the reflection agent applied over the surfaces of the reflection areas AR.

Also, the shape of the reflection areas AR is not limited to the strip shape as shown in FIG. 2, and the reflection areas AR may be formed in another shape.

The invention claimed is:

1. A diffusion member that receives light at a light receiving surface, refracts the light while the light is traveling therethrough, and emits the light from a light emitting surface thereof,
wherein
a first reflection area having high reflectance and a second reflection area having low reflectance are alternately arranged parallel to each other on the light receiving surface,
a third reflection area having high reflectance and a fourth reflection area having low reflectance are alternately arranged parallel to each other on the light emitting surface,
the first reflection area and the fourth reflection area are opposed to each other, and
the second reflection area and the third reflection area are opposed to each other.

2. The diffusion member according to claim 1,
wherein,
when a direction in which the first reflection area and the second reflection area are arranged parallel to each other is called a parallel arrangement direction,
in the first reflection area, reflectance of a portion thereof including a first center which is a center of the first reflection area in the parallel arrangement direction is maximum first reflectance which is the highest reflectance,
in the first reflection area, reflectance of a portion extending away from the portion including the first center along the parallel arrangement direction is continuously decreased from the maximum first reflectance,
in the second reflection area, reflectance of a portion including a second center which is a center of the second reflection area in the parallel arrangement direction is minimum second reflectance which is the lowest reflectance, and
in the second reflection area, reflectance of a portion extending away from the portion including the second center along the parallel arrangement direction is continuously increased from the minimum second reflectance.

3. The diffusion member according to claim 2,
wherein
the reflectance at border between the first and second reflection areas are the same, and
the reflectance continuously varies from the maximum first reflectance to the minimum second reflectance.

4. The diffusion member according to claim 2,
wherein
when a direction in which the third reflection area and the fourth reflection area are arranged parallel to each other is called a parallel arrangement direction,
in the third reflection area, reflectance of a portion including a third center which is a center of the third reflection area in the parallel arrangement direction is maximum third reflectance which is the highest reflectance, and
in the third reflection area, reflectance of a portion extending away from the portion including the third center along the parallel arrangement direction is continuously decreased from the maximum third reflectance,
in the fourth reflection area, reflectance of a portion including a fourth center which is a center of the fourth reflection area in the parallel arrangement direction is minimum fourth reflectance which is the lowest reflectance, and
in the fourth reflection area, reflectance of a portion extending away from the portion including the fourth center along the parallel arrangement direction is continuously increased from the minimum fourth reflectance.

5. The diffusion member according to claim 4,
wherein
the reflectance at border between the third and fourth reflection areas are the same, and
the reflectance continuously varies from the maximum third reflectance to the minimum fourth reflectance.

6. The diffusion member according to claim 4, wherein the first reflection area has higher reflectance than the third reflection area.

7. The diffusion member according to claim 4, wherein
the maximum first reflectance is higher than the maximum third reflectance,
minimum first reflectance which is the lowest reflectance in the first reflection area is higher than minimum third reflectance which is the lowest reflectance in the third reflection area, and
reflectance from the maximum first reflectance to the minimum first reflectance is higher than reflectance from the maximum third reflectance to the minimum third reflectance.

8. A diffusion unit, comprising:
the diffusion member according to claim 1; and
a lens layer that refracts light emitted from the diffusion member while the light is traveling therethrough.

9. An illuminating unit, comprising:
a light source that emits light; and
the diffusion member according to claim 1 that receives light at the light receiving surface, refracts the light while the light is traveling therethrough, and emits the light from the light emitting surface.

10. An illuminating unit, comprising:
a light source that emits light; and
the diffusion unit according to claim 8 that receives light at the light receiving surface, refracts the light while the light is traveling therethrough, and emits the light from the light emitting surface.

11. A display device, comprising the illuminating unit according to claim 9.

* * * * *